(12) United States Patent
Messner

(10) Patent No.: US 9,155,287 B2
(45) Date of Patent: Oct. 13, 2015

(54) RETRACTABLE PET LEASH WITH BAG CONTAINER AND REMOVABLE FLASHLIGHT

(75) Inventor: Barry Messner, Anaheim Hills, CA (US)

(73) Assignee: MerchSource, LLC, Irvine, CA (US)

( * ) Notice: Subject to any disclaimer, the term of this patent is extended or adjusted under 35 U.S.C. 154(b) by 390 days.

(21) Appl. No.: 13/175,650

(22) Filed: Jul. 1, 2011

(65) Prior Publication Data

US 2012/0006284 A1  Jan. 12, 2012

Related U.S. Application Data

(60) Provisional application No. 61/360,573, filed on Jul. 1, 2010.

(51) Int. Cl.
| | | |
|---|---|---|
| *B65H 75/34* | (2006.01) | |
| *A01K 27/00* | (2006.01) | |
| *B65H 75/44* | (2006.01) | |

(52) U.S. Cl.
CPC ............ *A01K 27/004* (2013.01); *A01K 27/006* (2013.01); *A01K 27/008* (2013.01); *B65H 75/4431* (2013.01); *B65H 2701/35* (2013.01); *B65H 2701/533* (2013.01)

(58) Field of Classification Search
CPC .. A01K 27/004; A01K 27/006; A01K 27/008
USPC .......................................... 119/796, 795, 794
See application file for complete search history.

(56) References Cited

U.S. PATENT DOCUMENTS

| | | | |
|---|---|---|---|
| 5,890,456 A | 4/1999 | Tancrede | |
| 6,223,695 B1 | 5/2001 | Edwards et al. | |
| 6,240,881 B1 | 6/2001 | Edwards et al. | |
| 6,289,849 B1 | 9/2001 | Macedo et al. | |
| 7,044,080 B2 | 5/2006 | Rabello | |
| 7,194,980 B2 | 3/2007 | Greeson | |
| 7,367,286 B2 * | 5/2008 | Beaupre ...................... | 119/795 |
| 7,980,202 B2 * | 7/2011 | Bentz et al. ................. | 119/796 |
| 8,418,659 B2 * | 4/2013 | Harruna ...................... | 119/796 |
| 8,516,979 B2 * | 8/2013 | Ek ................................ | 119/796 |
| 8,695,537 B2 * | 4/2014 | Bizzell et al. ............... | 119/796 |
| 8,826,864 B2 * | 9/2014 | Tang ............................ | 119/795 |
| 2003/0154931 A1 * | 8/2003 | Ostrowiecki ............... | 119/796 |
| 2006/0162675 A1 | 7/2006 | Ghalebi et al. | |

* cited by examiner

*Primary Examiner* — Richard Price, Jr.
(74) *Attorney, Agent, or Firm* — Avyno Law P.C.

(57) ABSTRACT

A retractable pet leash includes a leash housing, a gear element located within the leash housing, a channel extending along a length of the leash housing, a bag container integrated into either a first side panel or a second side panel of the leash housing, and a pull trigger in communication with the gear element. The leash housing includes the first side panel secured to the second side panel, a back portion including a handle, and a front portion including an opening through which a string portion of the leash extends and retracts. The gear element is configured for extending and retracting the string portion of the leash. The channel is configured for receiving a removable coupling member of a flashlight. The pull trigger is alterable between a retracted position and a pulled position. In the retracted position, the gear element is locked. In the pulled position, the gear element is unlocked.

15 Claims, 4 Drawing Sheets

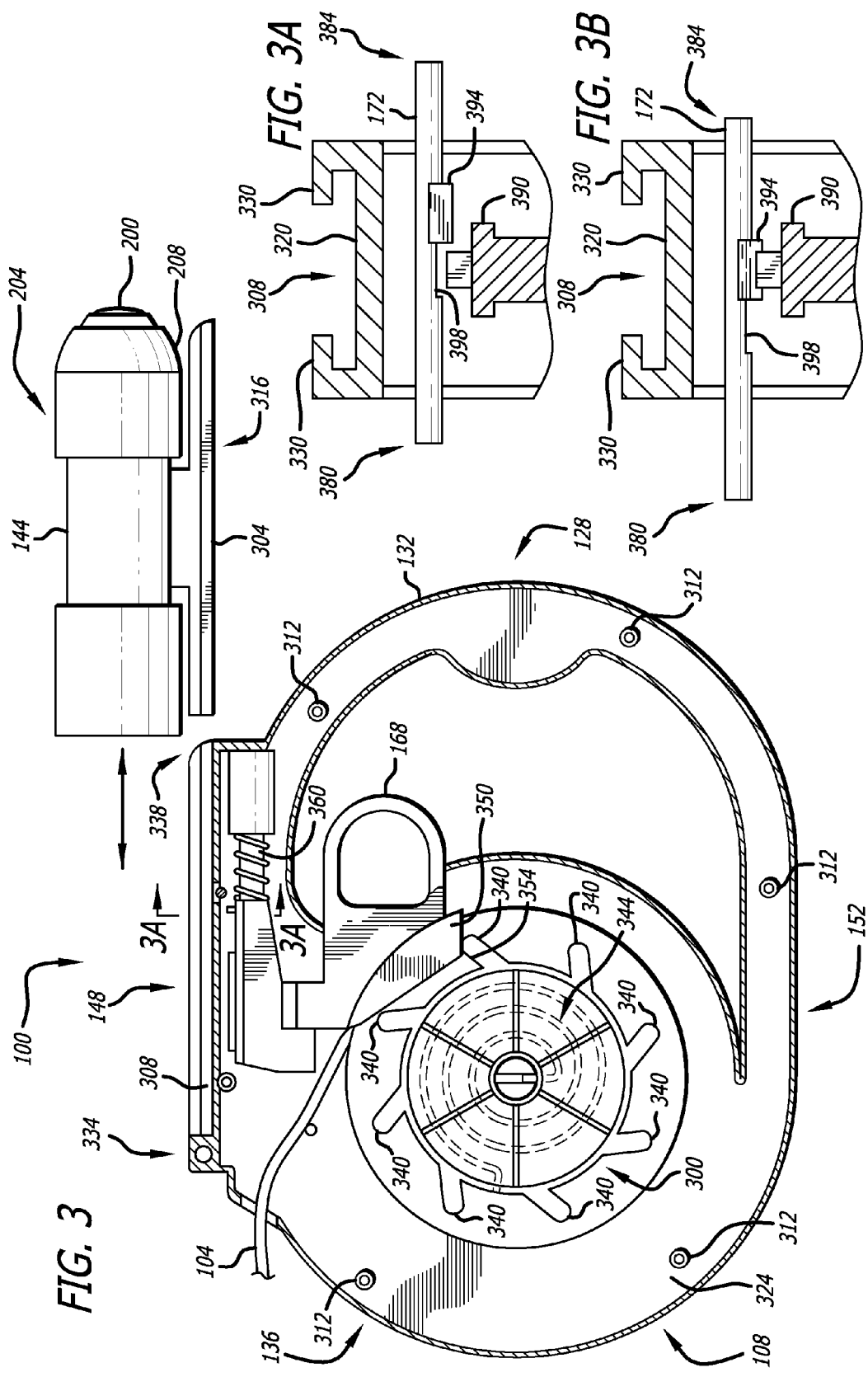

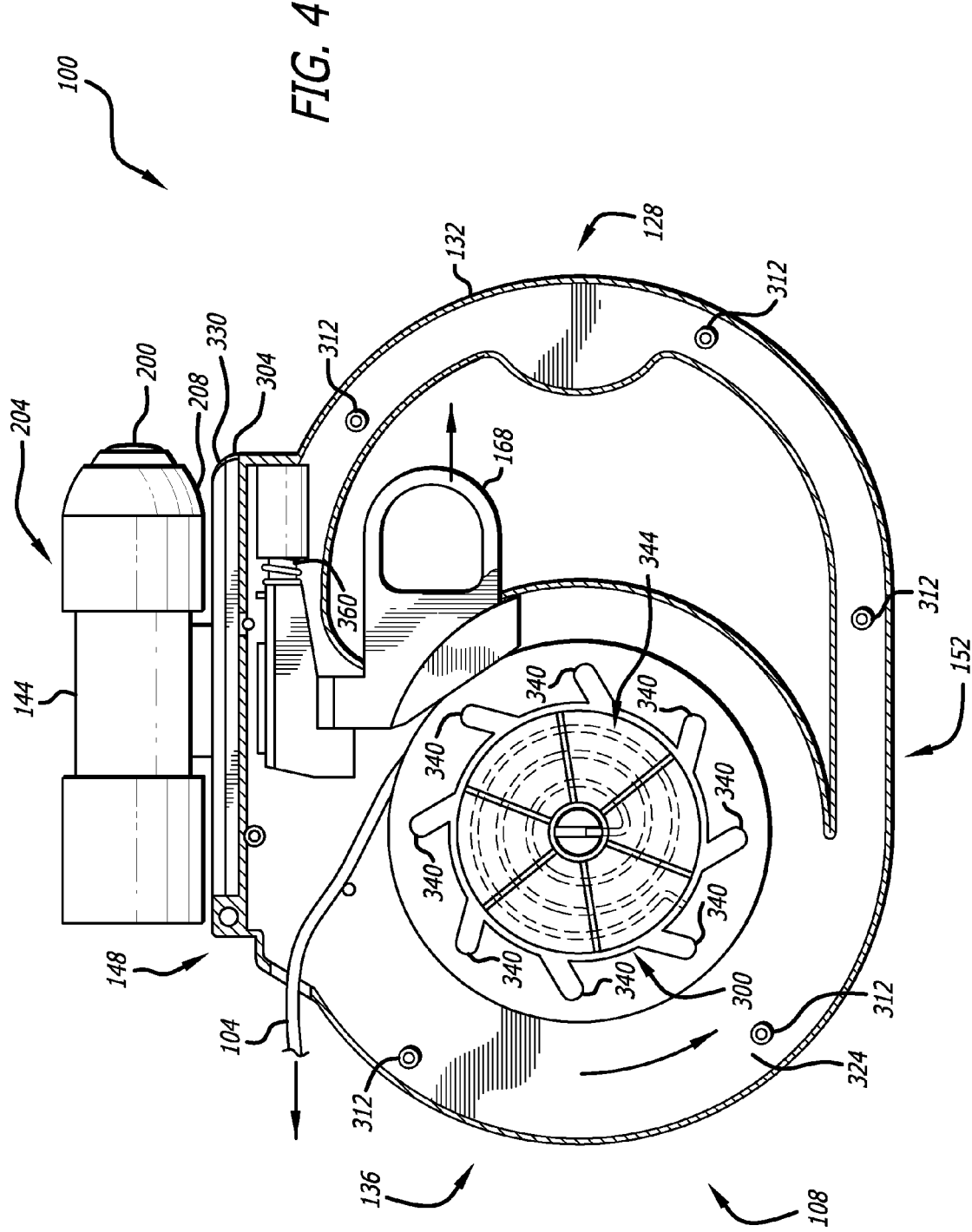

RETRACTABLE PET LEASH WITH BAG CONTAINER AND REMOVABLE FLASHLIGHT

PRIORITY CLAIM

The present application claims the benefit of U.S. Provisional Patent Application Ser. No. 61/360,573, filed Jul. 1, 2010, titled "RETRACTABLE PET LEASH WITH BAG CONTAINER AND REMOVABLE FLASHLIGHT" the content of which is incorporated into this application by reference in its entirety.

BACKGROUND OF THE INVENTION

1. Field of the Invention

The present invention relates generally to a pet leash, and in particular, a pet leash having an integrated bag container and a removable flashlight.

2. Related Art

Many different types of leash devices are utilized by pet owners in conjunction with collars and/or harnesses for constraining various types of pets, including cats and dogs, for example. Many pet owners utilize leash devices while walking there pets, whether during the night or during the day. When pet owners walk their pets at night, many times it is useful for the owner to have a flashlight available for use. Pet owners are often times required to appropriately discard their pets' refuse, thus creating a need for many owners to carry pet refuse bags with them while taking their leashed pets on walks.

Existing pet leashes may include string portions that are retractable to provide more flexibility for the owner in controlling the distance leashed pets may travel. To better control leashed pets, it is desirable that the leash device have effective and efficient means for controlling when and in what manner the string portion retracts and/or extends.

In view of the foregoing, an ongoing need exists for effective and efficient retractable pet leashes that include control mechanisms that are easy to use. A need for retractable pet leashes also still exists that includes flashlights and pet refuse bag containers.

SUMMARY

Accordingly, a retractable pet leash is provided having a removable flashlight and integrated refuse bag holder. The retractable pet leash includes a leash housing having a first side panel secured to a second side panel, a back portion including a handle, and a front portion including an opening through which a string portion of the leash extends and retracts. The pet leash further includes a gear element configured for retracting and extending the string portion of the leash, the gear element being located between the first side panel and the second side panel. A channel extending along a length of the leash housing is provided and configured for receiving a removable coupling member of a flashlight. The leash further includes a bag container integrated into the leash housing. A pull trigger may also be provided in communication with the gear element. The pull trigger being alterable between a retracted position and a pulled position. The pull trigger, when in the retracted position, locks the gear element. When in the pulled position, the gear element is unlocked for retracting and extending the string portion.

Optionally, the locking mechanism may include a push button alterable between a middle position and a side position. In the middle position, the pull trigger is freely alterable between the retracted position and the pulled position. In the side position, the pull trigger is maintained in the pulled position. In other implementations, the push button includes a first end projecting outward from the first side panel, and a second end projecting outward from the second side panel. In yet other implementations, when the push button is in the middle position, an engagement member of the pull trigger passes freely within a recessed portion of the push button when the pull trigger is altered between the retracted position and the pulled position. In some implementations, when the push button is in the side position, the engagement member of the pull trigger is held in position via a projection member extending downward from the push button. In still other implementations, when the pull trigger is in the retracted position, a portion of the pull trigger engages a cam surface of a tooth element extending from the gear element.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood by referring to the following figures. The components in the figures are not necessarily to scale, emphasis instead being placed upon illustrating the principles of the invention. In the figures, like reference numerals designate corresponding parts throughout the different views.

FIG. 3 is a side elevation view of the interior of the retractable pet leash illustrated in FIG. 1 with the pull trigger in the retracted position, without the first side panel, and further showing the flashlight removed.

FIG. 3A is a cross-sectional view of a portion of the retractable pet leash, taken along line A-A of FIG. 3 and showing a push button of a locking mechanism in a middle or unlocked position.

FIG. 3B is a cross-sectional view of a portion of the retractable pet leash taken along line A-A in FIG. 3 and showing the push button of the locking mechanism in a side or locked position.

FIG. 4 is a side elevation view of the interior of the retractable pet leash illustrated in FIG. 1, without the first side panel, and showing the pull trigger in the pulled position.

DETAILED DESCRIPTION

The description of implementations below is presented for purposes of illustration and description. It is not exhaustive and does not limit the claimed invention to the precise form disclosed. Modifications and variations are possible in light of the description below or may be acquired from practicing the invention. The claims and their equivalents define the scope of the invention.

Figure 1:
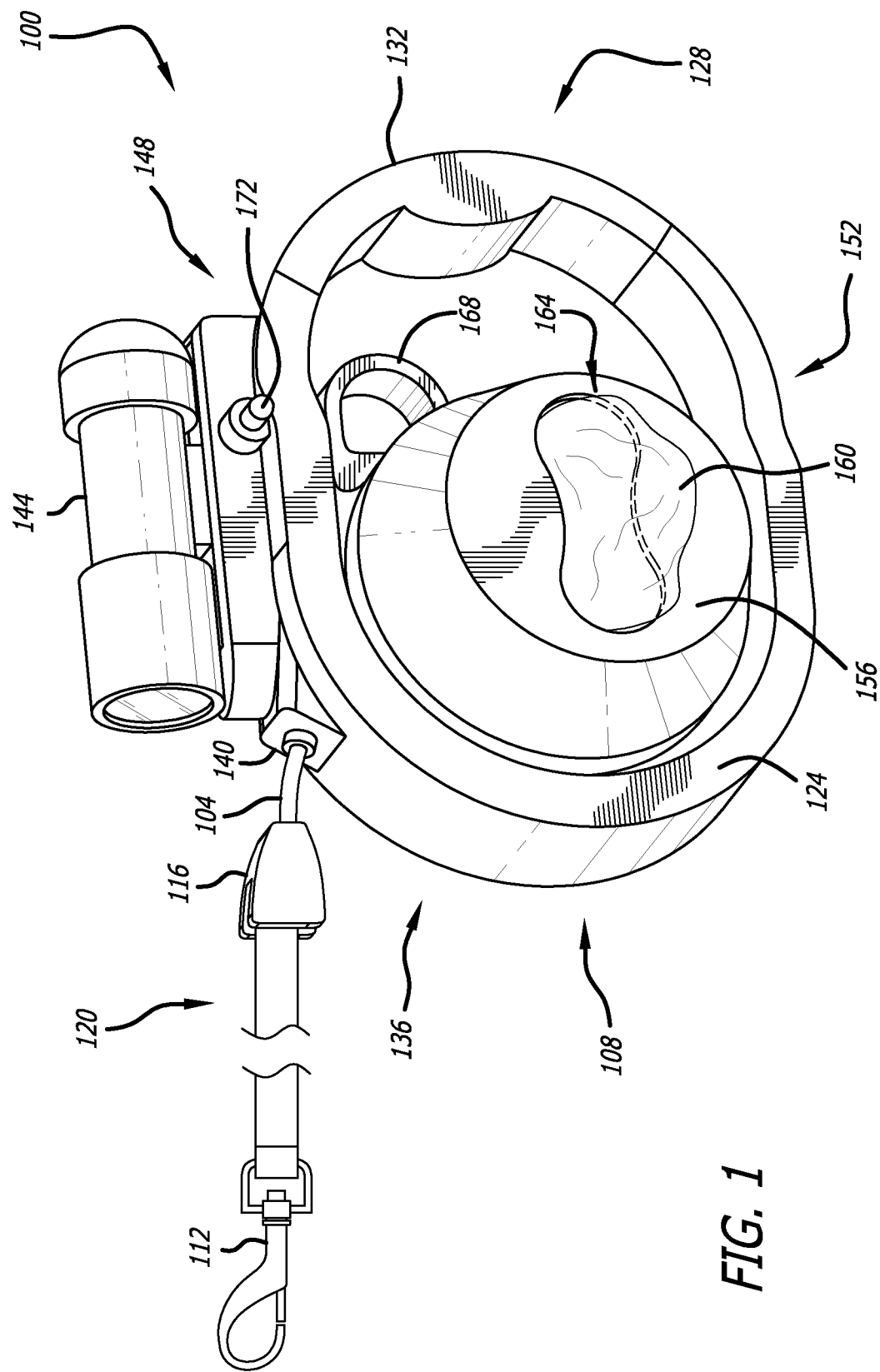
FIG. 1 is a perspective side view of an implementation of a retractable pet leash according to the present invention.

As illustrated in FIG. 1, a retractable pet leash 100 is provided that may be utilized in conjunction with collars, harnesses, and/or halters of various types of pets, including cats and dogs, for example. The retractable pet leash 100 according to the present invention generally includes a string portion 104 that may extend from, or retract into, a leash housing 108. The string portion 104 may be made of leather, twine, rope, nylon or any other suitable material. One end of the string portion 104 may include a clasp 112 or other suitable fastening device for coupling the string portion 104 to a pet harness or collar. The string portion 104 of the leash 100 may include a stopper element 116 at a predetermined position on the string portion 104, where the stopper element 116 is configured for stopping the string portion 104 from completely retracting into the leash housing 108, thus leaving a segment of the string portion 104 outside of the leash housing 108 at all times.

FIG. 1 is a perspective side view of an implementation of the retractable pet leash 100 according to the present invention. As illustrated in FIG. 1, the pet leash 100 generally includes the leash housing 108. The leash housing 108 may include: a first side panel 124 secured to a second side panel (not shown); a back portion 128 including a handle 132; and a front portion 136 including an opening 140 through which the string portion 104 of the leash 100 may extend or retract. The first side panel 124 may be secured to the second side panel by any suitable means; e.g., screws, adhesive, male and corresponding female elements, and the like. (See FIG. 3, for an example of female elements 312 located on the interior of the second side panel 324, configured for receiving corresponding male elements (not shown) extending from the interior of the first side panel 124, thus securing the first side panel 124 to the second side panel 324.) In some implementations, the leash housing 108 may be a plastic material, and the first side panel 124 may be molded to the second side panel. In some implementations, the handle 132 of the retractable pet leash 100 may include a soft and durable material (e.g., rubber) for providing comfort to a user. As discussed below in conjunction with FIGS. 3-4, the retractable pet leash 100 may further include a gear element (see FIG. 3, element 300) configured for retracting and extending the string portion 104 of the leash 100, where the gear element may generally be located within the leash housing 108 between the first side panel 124 and the second side panel.

The retractable pet leash 100 may further include a flashlight 144 removably secured to the leash housing 108. The removable flashlight 144 may be operated by a user while secured to the leash housing 108, or when removed from the leash housing 108, and may be battery operated, for example. As shown in FIG. 1, the flashlight 144 may be removably affixed to a top portion 148 of the leash housing 108. Those of skill in the art will recognize that the flashlight 144 may be removably affixed to other portions of the leash housing 108, such as the front portion 136 or a bottom portion 152 of the leash housing 108, or either the first side panel 124 or the second side panel, for example. The flashlight 144 may be configured for removably securing to the leash housing 108 by any suitable means. As discussed below in conjunction with FIGS. 3-3B, the flashlight 144 may include a coupling member (see FIG. 3, element 304) configured for extending through a channel (see FIGS. 3-3B, element 308) located on the top portion 148 of the leash housing 108 (e.g., a tongue-and-groove sliding type configuration, where the coupling member is slidably removable from the channel). As another example, the flashlight 144 may be configured for removably securing to the leash housing 108 via adhesive, mating male and female components, hook-and-loop fastener material, and the like.

As further illustrated in FIG. 1, the leash housing 108 may include a bag container 156 integrated into the leash housing 108. In the present example, the bag container 156 is integrated into the first side panel 124 of the leash housing 108. In some implementations, the bag container 156 may be integrated into the second side panel of the leash housing 108. As another example, the bag container 156 may be integrated into the top portion 148 of the leash housing 108 and the flashlight 144 may be removably secured to either the first side panel 124 or the second side panel of the leash housing 108. As yet another example, the bag container 156 may be removable from the leash housing 108. Those of skill in the art will appreciate that various combinations of the foregoing are possible and within the scope of the present invention. As shown in FIG. 1, the bag container 108 may contain pet refuse bags 160, and may include an opening 164 configured for easily dispensing the bags 160.

FIG. 1 further illustrates a pull trigger 168 of the retractable pet leash 100. As will be discussed in further detail below, the pull trigger 168 may be in communication with the gear element. The pull trigger 168 may be alterable by a user between a retracted position and a pulled position. In the retracted position, the gear element of the leash 100 may be locked, such that the string portion 104 may not be extended nor retracted. When a user pulls the trigger 168 towards the handle 132, thus altering the pull trigger 168 from the retracted position to the pulled position, the gear element may be unlocked; i.e., the string portion 104 may be retracted or extended. As will be further discussed below in conjunction with FIGS. 3A-3B, the pet leash 100 may include a push button 172 in communication with the gear element and the pull trigger 168. The push button 172 may form part of a locking mechanism configured for locking the pull trigger 168 in the pulled position.

Figure 2:
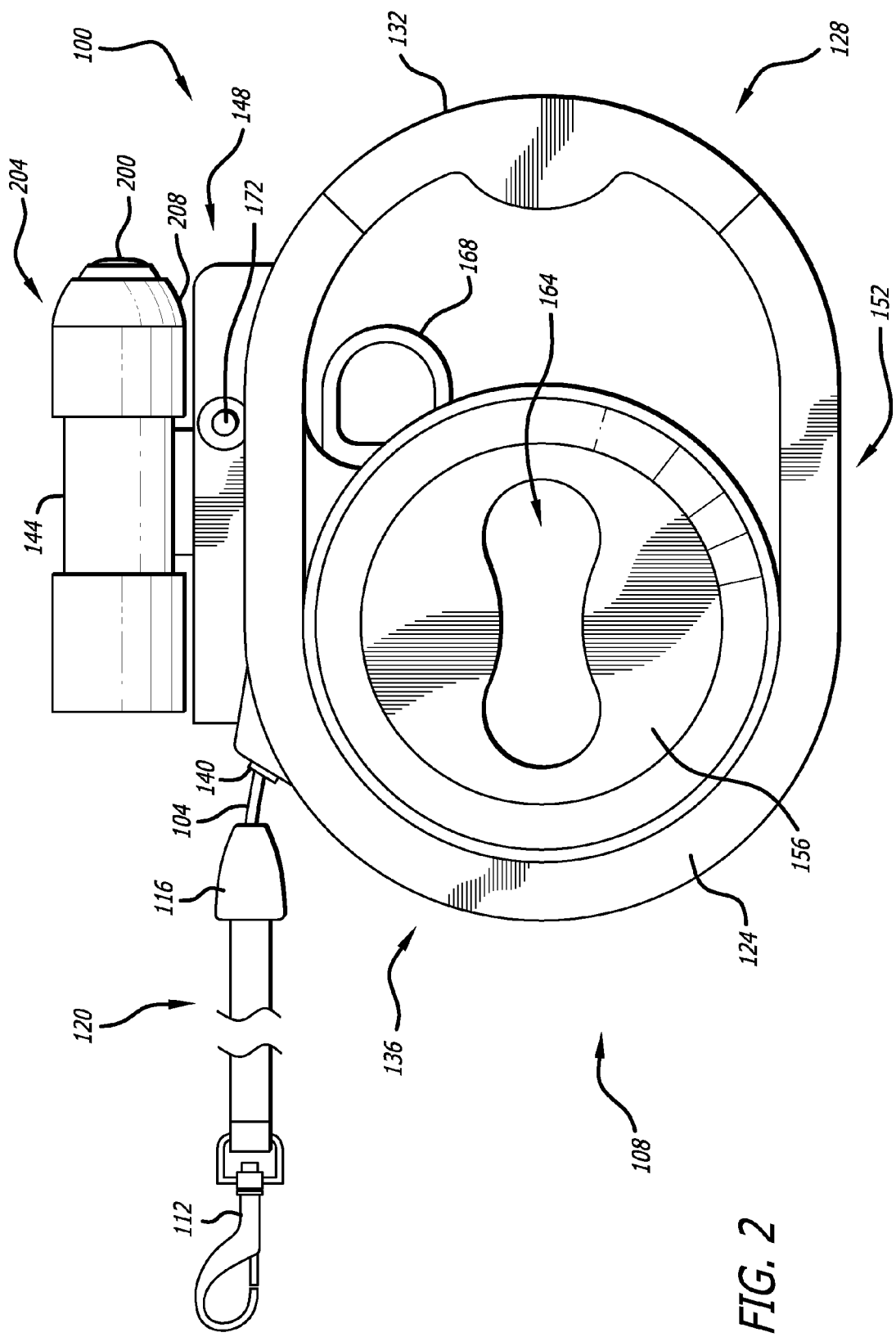
FIG. 2 is a side elevation view of the retractable pet leash illustrated in FIG. 1, showing a first side panel, where the bag container is empty.

FIG. 2 is a side elevation view of the retractable pet leash 100 illustrated in FIG. 1, showing the first side panel 124, where the bag container 156 is empty. As shown in FIG. 2, in some implementations, the flashlight 144 may include a button 200 on a rear end 204 of the flashlight 144 that may be pushed by a user to turn the removable flashlight 144 on and off. The button 200 may form part of a threaded cap 208 that may be removably secured to the rear end 204 of the flashlight 144. The threaded cap 208 may be removed by the user to add, remove or replace a battery within the flashlight 144, for example.

FIG. 3 is a side elevation view of the interior of the retractable pet leash 100 illustrated in FIG. 1, without the first side panel 124, thus illustrating the interior of the second side panel 324. FIG. 3 also illustrates the flashlight 144 removed from the channel 308, where the channel 308 extends along a length of the top portion 148 of the leash housing 108. In the present example, the flashlight 144 includes the coupling member 304 configured for removably extending through at least a portion of the length of the channel 308. The coupling member 304 may include a substantially flat bottom portion 316 for slidably securing the coupling member 304 within the channel 308 (and/or slidably removing the coupling member 304 from the channel 308) and into contact with a substantially flat bottom surface (see FIGS. 3A-3B, element 320) of the channel 308. The channel 308 may include inwardly projecting ridges (see FIGS. 3A-3B, element 330) that limit the coupling member 304 to longitudinal removal. A first end 334 of the channel 308 may be closed off, such that the coupling member 304 may only be removed from an open second end 338 of the channel 308.

FIG. 3 further illustrates one example of a gear element 300 of the retractable pet leash 100. As shown in FIG. 3, the pull trigger 168 is in communication with the gear element 300, and the pull trigger 168 is in the retracted position. The gear element 300 may include a plurality of teeth 340, where the teeth 340 extend outward from a spool portion 344 (i.e., a portion of the gear element 300 configured for retaining the string portion 104 of the retractable leash 100) of the gear element 300. In the present example, when the pull trigger 168 is in the retracted position, a portion 350 of the pull trigger 168 engages a cam surface 354 of a tooth element 340, thus locking the gear element 300 such that the string portion 104 may not be retracted nor extended. In some implementations, the pull trigger 168 may engage one or more teeth 340 on either side of the gear element 300 when the pull trigger 168 is in the retracted position. As further illustrated in FIG. 3, the retractable leash 100 may include a spring 360 in communication with the pull trigger 168. The spring 360 may be configured for returning the pull trigger 168 to the retracted position when the pull trigger 168 is released by a user, thus altering the pull trigger 168 from the pulled position to the retracted position.

FIG. 3A is a cross-sectional view of a portion of the retractable pet leash 100 illustrated in FIG. 3, taken across line 3A in FIG. 3, showing the channel 308 for receiving the coupling member 304 of the flashlight 144, and also showing the push button 172 of the locking mechanism in a middle, i.e., unlocked position. The push button 172 may include a first end 380 that extends outward from the first side panel 124 of the leash housing 108 (i.e., perpendicular to the first side panel 124). The push button 172 may include a second end 384 that extends outward from the second side panel 324 of the leash housing 108 (i.e., perpendicular to the second side panel 324). The push button 172 may be alterable between the middle position (i.e., the unlocked position) and a side position (i.e., a locked position; see FIG. 3B). For example, the push button 172 may be pushed, pulled or otherwise manually manipulated by a user between the middle position and the side position. When the push button 172 is in the middle position, the user may freely alter the pull trigger 168 between the retracted position and the pulled position. As illustrated in FIG. 3A, when the push button 172 is in the middle position, an engagement member 390 of the pull trigger 168 may pass freely within a recessed portion 398 of the push button 172 when the pull trigger 168 is altered between the retracted position and the pulled position. For example, when the push button 172 is in the middle position, a user may release the pull trigger 168 from the pulled position, and the pull trigger will automatically return to the retracted position via the spring 360.

FIG. 3B is a cross-sectional view of a portion of the retractable pet leash 100, taken across line 3A in FIG. 3, and showing the push button 172 of the locking mechanism in the side, i.e., locked position. When the push button 172 is in the side position, the pull trigger 168 will be locked in the pulled position when the pull trigger 168 is released by a user; i.e., the pull trigger 168 will remain in the pulled position until the push button 172 is altered by a user to the middle position, and the pull trigger 168 is subsequently released by a user. When the push button 172 is in the side position, and thus the pull trigger 168 is maintained in the pulled position, the string portion 104 may freely extend from or retract into the leash housing 108. As further illustrated in FIG. 3B, when the push button 172 is in the side position, the engagement member 390 may be held in position via a projection member 394 extending downward from the push button 172.

FIG. 4 is a side elevation view of the interior of the retractable pet leash 100 illustrated in FIG. 1, without the first side panel 124, and showing the pull trigger 168 in the pulled position. As shown in FIG. 4, when the pull trigger 168 is in the pulled position, the teeth 340 of the gear element 300 are unimpeded by any portion of the pull trigger 168. Thus, the string portion 104 is free to extend (and in the present example, the gear element 300 will turn in a counterclockwise motion) from the leash housing 108 when the string portion 104 is pulled by an exterior force, such as a leashed pet. In contrast, when an exterior force is not applied to the string portion 104 (e.g., the string portion 104 is not pulled by a leashed pet), and the pull trigger 168 is in the pulled position, the string portion 104 may automatically retract into the leash housing 108 (and in the present example, the gear element 300 will turn in a clockwise motion as a result of an internal spring-driven mechanism, for example) and around the spool portion 344 of the gear element 300. Those of skill in the art will appreciated that various mechanisms may be utilized for automatically retracting the string portion 104 into the leash housing 108.

In general, terms such as "coupled to," and "configured for coupling to," "secured to," "configured for securing to," and "in communication with" (for example, a first component is "coupled to" or is "configured for coupling to" or is "secured to" or is "configured for securing to" or "is in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:
1. A retractable pet leash comprising:
   a leash housing including:
   a first side panel secured to a second side panel;
   a back portion including a handle; and
   a front portion including an opening through which a string portion of the leash extends and retracts;
   a gear element configured for retracting and extending the string portion of the leash, the gear element having a spool portion for retaining the string portion of the leash and a plurality of teeth outwardly extending from the spool portion and being centrally located within the front portion between the first side panel and the second side panel;
   a pull trigger having a stop for engaging and disengaging from the teeth of the gear element, the pull trigger being coupled to the front portion and alterable along a common horizontal axis between a retracted position and a pulled position, where in the retracted position, the gear element is locked, and in the pulled position, the gear element is unlocked for retracting and extending the string portion, and where in the retracted position, a portion of the pull trigger engages a cam surface of a tooth element extending from the gear element.

2. The retractable pet leash of claim 1 further comprising a bag container integrated into the leash housing.

3. The retractable pet leash of claim 2, where a bag container is located on the first side panel.

4. The retractable pet leash of claim 3, where the bag container includes at least one pet refuse bag within the bag container.

5. The retractable pet leash of claim 2, where a bag container is located on the second side panel.

6. The retractable pet leash of claim 1 further comprising a channel extending along a length of the leash housing, the channel being configured for receiving a removable coupling member of a flashlight.

7. The retractable pet leash of claim 6, where the channel is located on a top portion of the leash housing.

8. The retractable pet leash of claim 1, further comprising a locking mechanism configured for locking the pull trigger in the pulled position.

9. The retractable pet leash of claim 8, where the locking mechanism includes a push button alterable between a middle position and a side position, where in the middle position, the pull trigger is freely alterable between the retracted position and the pulled position, and in the side position, the pull trigger is maintained in the pulled position.

10. The retractable pet leash of claim 9, where the push button includes:
    a first end projecting outward from the first side panel; and
    a second end projecting outward from the second side panel.

11. The retractable pet leash of claim 10, where in the middle position, an engagement member of the pull trigger passes freely within a recessed portion of the push button when the pull trigger is altered between the retracted position and the pulled position.

12. The retractable pet leash of claim 11, where in the side position, the engagement member is held in position via a projection member extending downward from the push button.

13. The retractable pet leash of claim 1, further comprising a flashlight removably secured to the leash housing.

14. The retractable pet leash of claim 13 where the flashlight includes a coupling member extending through a channel in engagement therewith, the channel being located along a length of a top portion of the leash housing.

15. The retractable pet leash of claim 14, where the coupling member is slidably removable from the channel.

* * * * *